United States Patent [19]

Mastriano

[11] 4,418,497
[45] Dec. 6, 1983

[54] COMBINATION GREETING CARD, ORNAMENT AND SEED GERMINATION BOX

[76] Inventor: Michael D. Mastriano, 261 Shotwell Park, Syracuse, N.Y. 13206

[21] Appl. No.: 376,027

[22] Filed: May 7, 1982

[51] Int. Cl.³ .......................... A01C 1/04; B65D 65/28
[52] U.S. Cl. .......................................... 47/67; 47/56; 47/84; 206/423; 229/8; 428/7; 428/8; 428/542.2; 428/542.8
[58] Field of Search ...................................... 47/66–67, 47/56, 84; 229/8; 428/7–8, 542.2, 542.8; 206/423; 40/124.1

[56] References Cited

U.S. PATENT DOCUMENTS

| | | | |
|---|---|---|---|
| 1,671,273 | 5/1928 | Carley | 229/8 X |
| 2,150,453 | 3/1939 | Mulford et al. | 47/84 |
| 2,666,414 | 1/1954 | Burr et al. | 229/8 X |
| 2,770,407 | 11/1956 | Dahm | 229/8 |
| 2,833,074 | 5/1958 | Jannes | 428/7 X |
| 2,935,238 | 5/1960 | Koehler | 40/124.1 X |
| 3,498,520 | 3/1970 | Zumpel et al. | 229/8 |
| 3,571,958 | 3/1971 | Stevens et al. | 428/7 X |
| 4,087,576 | 5/1978 | Patterson | 428/8 |
| 4,163,343 | 8/1979 | Schoenfield | 47/56 X |

FOREIGN PATENT DOCUMENTS

| | | | |
|---|---|---|---|
| 467044 | 6/1914 | France | 47/66 |
| 7802783 | 9/1979 | Netherlands | 47/56 |

*Primary Examiner*—Robert E. Bagwill
*Attorney, Agent, or Firm*—Bruns & Jenney

[57] ABSTRACT

A combination greeting card, ornament and seed germination receptacle which comprises an initially flat, scored blank that is foldable into a three-dimensional hollow ornament. A greeting message is printed on the blank and the latter in its flat form is adapted to be received in a mailing envelope and mailed as a greeting card. A relatively low profile seed germination packet is mounted on the blank and is located so that when the blank is folded into a three-dimensional ornament the latter forms an enclosure for the packet. The enclosure is provided with window openings located so that light can enter the enclosure and aid in the seed germination. The ornament with the seed packet therein can be hung on a Christmas tree or placed on any flat surface such as a table or mantle.

5 Claims, 5 Drawing Figures

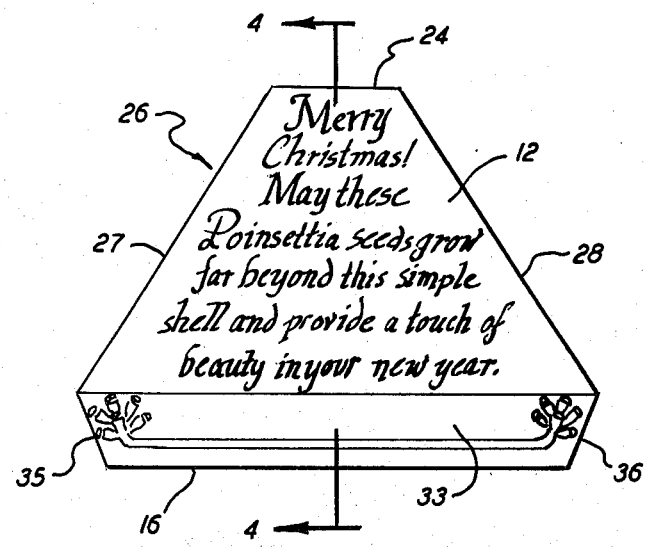
FIG. 2
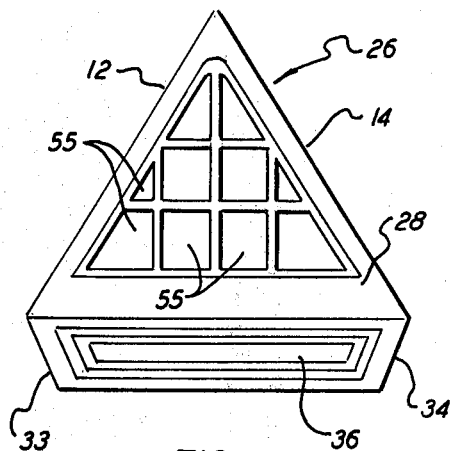
FIG. 3
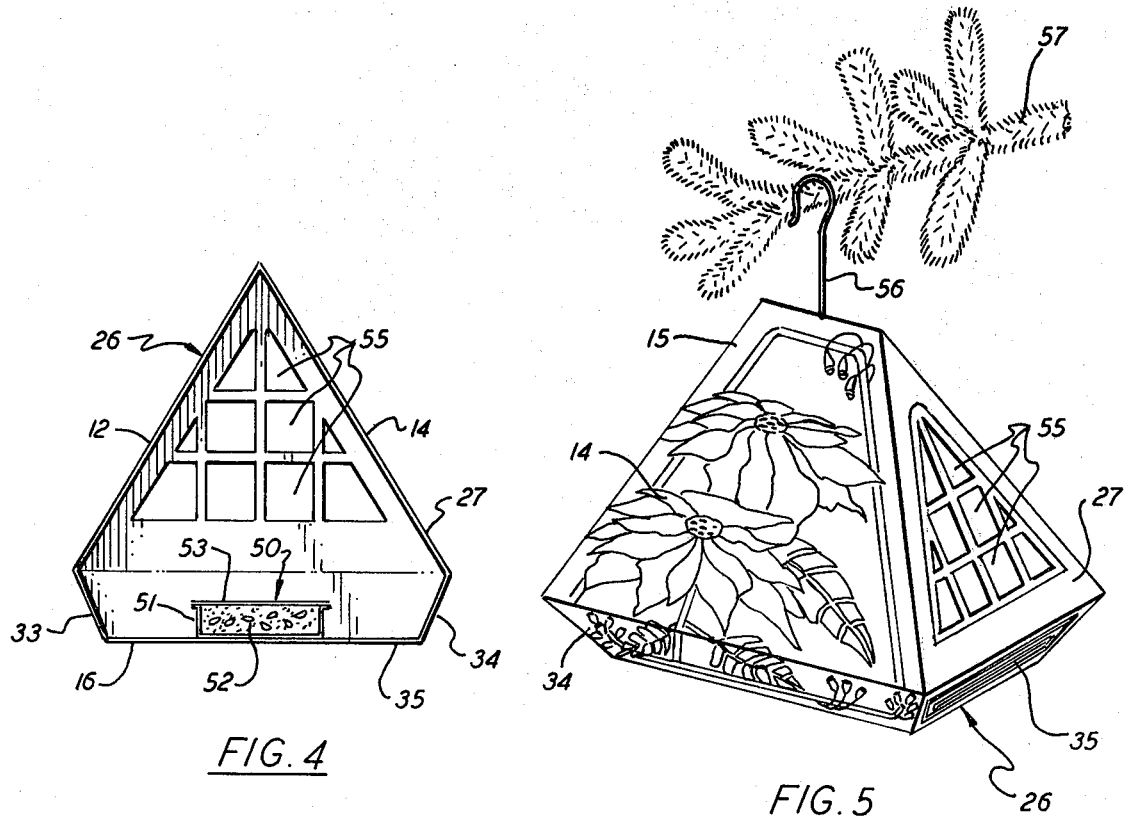
FIG. 4
FIG. 5

COMBINATION GREETING CARD, ORNAMENT AND SEED GERMINATION BOX

BACKGROUND OF THE INVENTION

This invention relates generally to the greeting card-display art, and has particular reference to a novel greeting card, ornament and seed germination box combination.

Heretofore, greeting cards have been available that can be mailed flat and then upon receipt can be fashioned into a three-dimensional ornament or display device. Displays known as pop-up displays have also been available, these being devices that can be mailed flat but which, upon removal from the mailing envelope, spring into three-dimensional form due to an internal spring or resilient element forming a part of the device. Greeting cards and displays of this type are disclosed in U.S. Pat. Nos. 2,770,407; 2,883,074 and 3,571,958. U.S. Pat. No. 3,571,958 represents the closest prior art known to the applicant but it differs from the present invention in that there is no provision for a seed packet or for an enclosure in which seed germination can occur.

SUMMARY OF THE INVENTION

The combination greeting card, ornament and seed germination receptacle of the present invention comprises an initially flat, scored blank that is foldable into a three-dimensional hollow ornament. A greeting message is printed on one or more areas of the blank and the latter in its flat or flat folded form is adapted to be received in a mailing envelope and mailed as a greeting card.

A relatively low profile seed germination packet is mounted on the blank and is located so that when the blank is folded into a three-dimensional ornament the latter forms an enclosure for the packet. The enclosure is provided with window openings located above the seed packet so that light can enter the enclosure and aid in the seed germination. The ornament with the seed packet therein can be hung on a Christmas tree, for example, or simply placed on any flat surface such as a table or mantle.

BRIEF DESCRIPTION OF THE DRAWINGS

FIG. 2 is a front elevation of an ornament fashioned from the blank of FIG. 1;

FIG. 3 is an end elevation of the ornament of FIG. 2;

FIG. 4 is a vertical sectional view through the ornament taken on line 4—4 of FIG. 2; and FIG. 5 is a perspective view of the ornament suspended from the branch of a Christmas tree.

DESCRIPTION OF THE PREFERRED EMBODIMENT

Figure 1:
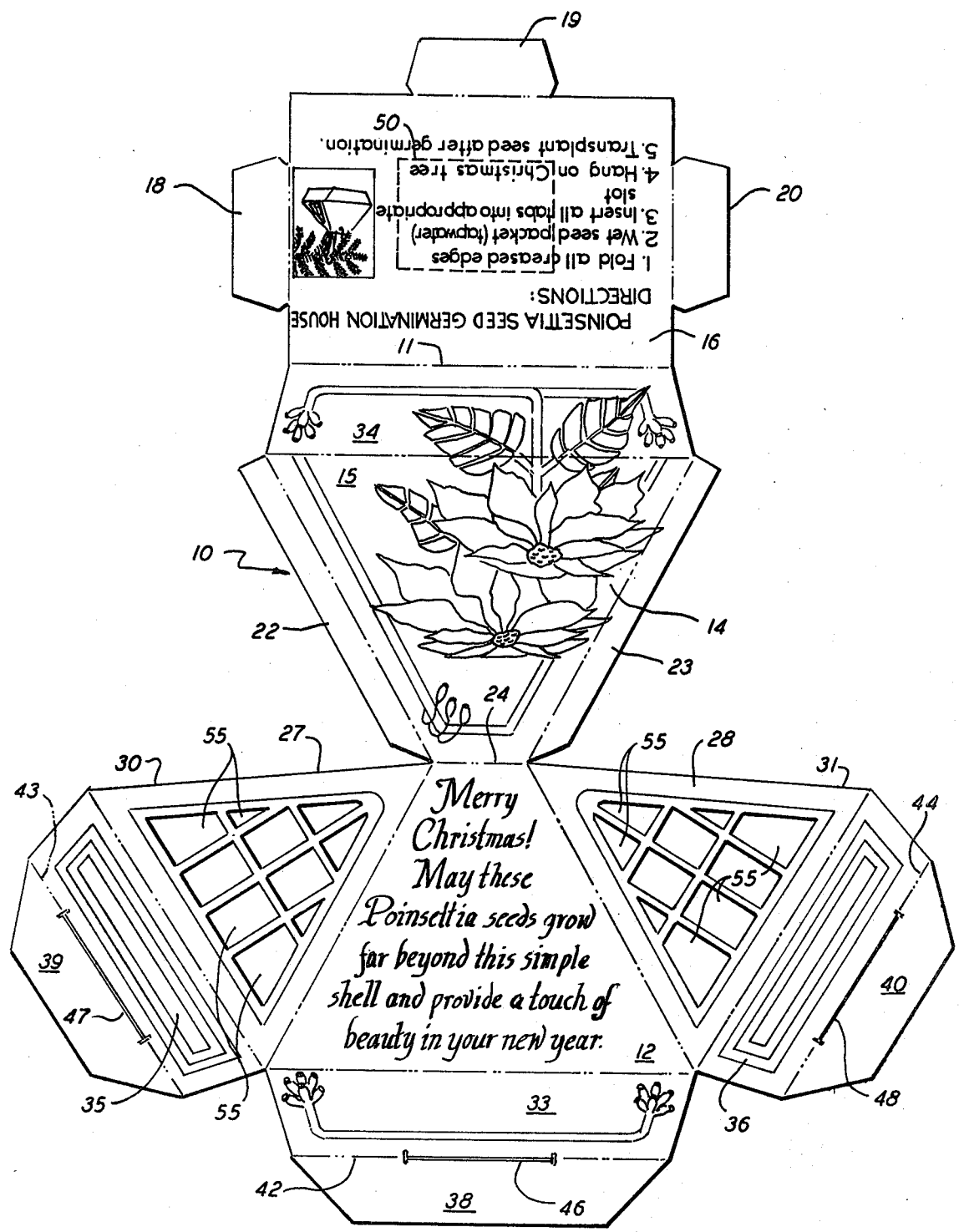
FIG. 1 is a top plan view of a flat, scored blank that is foldable into the three-dimensional ornament shown in FIGS. 2-5.

Having reference now to the drawings, FIG. 1 illustrates a flat blank 10 of thin cardboard or heavy paper that can be formed as by diecutting and scored along fold lines one of which is indicated at 11. In the illustrated embodiment, blank 10 and the three-dimensional ornament that can be formed therefrom, as will be described hereinafter, serve as a Christmas card and Christmas ornament. To this end, the blank 10 has a Christmas greeting printed on one of its flaps 12 and may have a picture 14 of a typical Christmas plant such as a Poinsettia on another flap 15.

The blank 10 can be mailed just as it is shown in FIG. 1 in a conforming envelope (not shown) but preferably will be folded so that it can be received in a smaller envelope. Thus, the blank can be folded on the score line 11 so that the adjacent flap 16 and its associated tabs 18, 19 and 20 are positioned beneath the flap 15 and its associated tabs 22 and 23. Thereafter, the blank can be folded on the score line 24 to bring the message flap 12 and its associated flaps and tabs into overlying relationship with the first folded flap 16. This results in a three layered flat greeting card with the Christmas message on one side and the Poinsettia picture 14 on the other.

Upon receipt of the greeting card, the recipient can fashion it into the three-dimensional ornament generally indicated at 26 in FIGS. 2-5. This is accomplished by folding the blank 10 on all of its score lines so that the message flap 12 becomes the front of the ornament, the picture flap 15 the back, and the flaps 27 and 28 the left and right ends respectively. In making this assembly, the folded tabs 22 and 23 will be positioned beneath the free edges 30 and 31 respectively of the end flaps 27,28.

The front, back, left and right ends of the ornament all have inwardly sloping lower flaps indicated by reference numbers 33,34,35 and 36, respectively. The flap 16 that is attached along the score line 11 to the back lower flap 34 becomes the bottom of the ornament and is horizontally disposed in its intended normal position.

The lower flaps 33,35 and 36, FIG. 1, have tabs 38, 39 and 40 respectively connected to them along score lines 42,43 and 44. These score lines are respectively provided with slits 46,47 and 48 as shown. In forming the ornament 26, the tabs 38,39 and 40 are folded so as to be horizontally disposed in overlying engagement with the bottom flap 16, and the bottom flap tabs 18,19 and 20 extend upwardly through the slits 47,46 and 48 respectively to maintain the ornament in its assembled three-dimensional form.

In accord with the invention, the ornament or ornamental display just described provides an enclosure for a seed germination packet generally indicated at 50 in FIGS. 1 and 4. The packet has a relatively low profile and is secured as by an adhesive to the underside of flap 16 as shown in FIG. 1. With this arrangement, when the blank 10 is folded to form the ornament 26, flap 16 becomes the bottom flap and supports the seed packet in the interior of the ornament as shown in FIG. 4.

Seed germination packet 50 is comprised of a shallow tray 51 of thin plastic that is filled with a mixture 52 of flower or plant seeds and a material such as commercially available "Vermiculite". A thin paper cover 53 is adhesively secured to the upper edges of the tray 51 to hold the seed mixture therein. This cover is removed just prior to final assembly of the ornament and several drops of water are added to the seed mixture to initiate germination.

To allow light to get into the interior of the ornament and aid in the germination of the seeds, the left and right end flaps 27 and 28 are provided with cut-outs 55 which form window openings as shown in the drawings. These are located above the seed packet 50 as best shown in FIG. 4.

As noted hereinabove, the ornament 26 can be observed and enjoyed by placing it on a table or mantle or, alternatively, it can be provided with a hook 56 and suspended from the branch 57 of a Christmas tree as indicated in FIG. 5.

From the foregoing description it will be apparent that the present invention provides a novel and pleasing greeting card, ornament and seed germination box combination. As will be understood by those familiar with the art, the invention may be embodied in other specific forms without departing from the spirit or essential characteristics thereof.

I claim:

1. A combination greeting card, ornament and seed germination box comprising an initially flat blank that is foldable into a three-dimensional hollow ornament, a portion of the blank having a greeting message printed thereon, the blank in its flat form being adapted to be received in a mailing envelope and mailed as a greeting card, and a seed germination packet mounted on the blank, the seed packet being located so that when the blank is folded into a three-dimensional hollow ornament it forms an enclosure for the packet, a portion of the blank having cut-outs forming window openings to permit light to enter the ornament and aid in the seed germination.

2. The combination as defined in claim 1 wherein the blank is comprised of a plurality of flaps that are connected to one another along score lines.

3. The combination as defined in claim 2 wherein one of the flaps forms the bottom of the three-dimensional ornament, the seed germination packet being mounted on said flap.

4. The combination as defined in claim 2 wherein the ornament includes opposed side wall flaps, each of said flaps having window openings therein.

5. A combination greeting card, ornament and seed germination receptacle consisting of an initially flat blank that is foldable into a three-dimensional hollow ornament, the blank comprising a plurality of flaps connected to one another along score lines, at least one of the flaps having a greeting message thereon, the blank in its flat form being adapted to be received in a mailing envelope and mailed as a greeting card, the blank when folded into a three-dimensional hollow ornament having a bottom flap that is horizontally disposed when the ornament is in its intended normal position, and a seed germination packet mounted on the bottom flap so as to be positioned in the interior of the ornament, at least one of the remaining flaps having cut-outs forming window openings above the packet whereby light can enter the ornament and aid in the seed germination.

* * * * *